(12) United States Patent
Szlam et al.

(10) Patent No.: US 6,362,838 B1
(45) Date of Patent: *Mar. 26, 2002

(54) METHOD FOR CONSOLIDATION OF MULTIPLE DATA SOURCES

(75) Inventors: Aleksander Szlam, Norcross; James E. Owen, Smyrna, both of GA (US)

(73) Assignee: Inventions, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/908,854

(22) Filed: Aug. 8, 1997

Related U.S. Application Data

(62) Division of application No. 08/441,830, filed on May 16, 1995, now Pat. No. 5,675,637.

(51) Int. Cl.⁷ ................................................. G06F 3/00
(52) U.S. Cl. .................... 345/762; 379/142.17
(58) Field of Search .......................... 345/333; 707/501, 707/505, 509, 201, 102, 906, 908, 515–516; 705/509

(56) References Cited

U.S. PATENT DOCUMENTS

| | | |
|---|---|---|
| 4,656,623 A | 4/1987 | Dalby, Jr. et al. |
| 4,656,624 A | 4/1987 | Collins et al. |
| 4,757,267 A | 7/1988 | Riskin |
| 4,774,655 A | 9/1988 | Kollin et al. |

(List continued on next page.)

OTHER PUBLICATIONS

Microsoft Office 6–in–1 New Edition, Que Corporation, pp. 713–715, 726–727, 729–732, 1994.*
Microsoft office 6 in 1 Que Corporation, 1994.*

*Primary Examiner*—Cao H. Nguyen
(74) *Attorney, Agent, or Firm*—Troutman Sanders LLP; Charles L. Warner

(57) ABSTRACT

A method for consolidating the information from multiple information sources so as to provide a uniform set of screens for an agent. All of the information sources are automatically linked in a coherent manner, which is defined by the user. The provision of an information item into a field automatically accesses user-specified information items from the various information sources. The user may combine and present the information from the various information sources in a uniform manner so that a given item of information always appears at the same location on the screen, and in the form desired, regardless of the original display format that is used by the information source. The station (10) receives (501) the initial information item and then sends (503) this information item to the sources specified by the information field, receives additional information items from these sources, and displays or presents the information items received in any desired media type. The station determines (505) whether any of the information item that it received from a source is necessary to access another source. If so then the steps (503 and 505) are repeated with the new information items until all of the information items have been obtained from all of the sources. The station also transfers (507) information items input by the agent to the source specified by the information field into which the agent is entering the information. In this manner, changes to the records of a customer are automatically and instantly made in all of the sources. Thus, the agent need not switch between, be familiar with the details of operation of, or know how to access, a source, screen, or application, because these details are automatically tended to by the station 10. The agent can therefore devote his or her time to speedily and effectively servicing the customer.

34 Claims, 10 Drawing Sheets

U.S. PATENT DOCUMENTS

| | | |
|---|---|---|
| 5,001,710 A | 3/1991 | Gawrys et al. |
| 5,008,930 A | 4/1991 | Gawrus et at. |
| 5,012,512 A | 4/1991 | Basso et al. |
| 5,181,238 A | 1/1993 | Medamana et al. |
| 5,182,705 A * | 1/1993 | Barr et al. .................. 364/401 |
| 5,239,577 A | 8/1993 | Bates et al. |
| 5,287,403 A | 2/1994 | Atkins et al. |
| 5,311,572 A | 5/1994 | Friedes et al. |
| 5,408,528 A | 4/1995 | Carlson et al. |
| 5,416,833 A | 5/1995 | Harper et al. |
| 5,448,632 A | 9/1995 | Iyob et al. |
| 5,465,286 A | 11/1995 | Clare et al. |
| 5,479,497 A | 12/1995 | Kovarik |
| 5,481,603 A | 1/1996 | Gutierrez et al. |
| 5,506,897 A | 4/1996 | Moore et al. |
| 5,506,984 A * | 4/1996 | Miller ........................ 395/600 |
| 5,509,058 A | 4/1996 | Sestak et al. |
| 5,533,108 A | 7/1996 | Harris et al. |
| 5,619,708 A * | 4/1997 | Ho .............................. 395/767 |
| 5,666,553 A * | 9/1997 | Crozier ....................... 395/803 |
| 5,721,908 A * | 2/1998 | Lagarde et al. ............. 395/610 |
| 5,752,056 A * | 5/1998 | Celik .......................... 395/708 |

* cited by examiner

Page 2                                    20

NAME: ☐

ORDER NO. ☐

ITEM NO. ☐

ITEM COST: ☐

FIG. 2J

METHOD FOR CONSOLIDATION OF MULTIPLE DATA SOURCES

This application is a division of U.S. patent application Ser. No. 08/441,830 filed May 16, 1995, now U.S. Pat. No. 5,675,637.

TECHNICAL FIELD

This invention relates to service centers and, more particularly, describes a method for consolidating various types of information from multiple sources into a single, coherent presentation.

BACKGROUND OF THE INVENTION

Service centers and telephone service centers, also called call centers, are used for telephone sales, marketing, collections, customer service and customer inquiry. A call center typically has a plurality of agents who staff a plurality of agent data terminals and who communicate with the customer via telephone and other media, such as letters, facsimile (fax), and electronic mail (e-mail). The communication may be initiated by the call center (an outbound call) or may be initiated by the customer (an inbound call). Examples of call centers which accommodate both inbound and outbound calls are shown in the following U.S. Pat. Nos.: 4,797,911; 4,894,857; 5,070,525; 5,214,688; and 5,309,505.

However, a single information source, such as a host, database, server, or other information source, may not have all the information on a customer, or the latest information on a customer. It is possible to sequentially access multiple information sources so as to obtain the desired information. However, the agent must know which information source to access and how to access the desired information. This process is inefficient because the information sources are frequently incompatible and the information from one information source cannot be directly used to gain more information from another information source. Rather, the agent must often write down the information from one information source and manually enter the information to gain the additional information from the second information source. In addition to the time that this manual procedure requires, errors can occur, both in writing down the information and in entering the information. The result is that the agent is limited to only a single information source application if rapid processing is desired, or the agent must manually record and enter the information if multiple information sources are used.

Therefore, there is a need for a method and an apparatus which allow the agent to obtain the desired information from a plurality of information sources quickly and automatically, regardless of whether that information is in the form of text, fax, graphics, images, e-mail, video, audio, or some other media.

Another difficulty with using multiple information sources and applications is that there is generally no consistency among the application programs as to the screen display, formats, images, or even the function keys used for information processing or manipulation. For example, there is no consistency, from application program to application program, as to where, or even if, in a customer record the following information will be located: the customer name, the customer address, the customer account number, a picture, a signature, etc. As a result, an agent will often have to visually inspect each field in the record to determine what information is in that field and whether it is the desired information. This slows down the agent and increases the likelihood of an error, for example, the agent entering or retrieving the data in a similar-looking, but incorrect, field. Similarly, from screen to screen, the function keys may initiate different tasks, or the same task may appear on different function keys. This leads to frustration, delays, errors, and a general loss of efficiency.

Therefore, there is a need for a method and an apparatus which present a uniform set of screens for the agent and which automatically accesses, in the background, the correct field in a record on the desired information source when an item of information is desired.

There is also a need for a method and an apparatus which, from screen to screen, and from information source to information source, present uniform and consistent data manipulation icons to the agent.

Even if multiple hosts can be conveniently accessed by the agent the agent must sometimes query one host to obtain a first item of information, use this first item of information to query a second host to obtain a second item of information, use this second item of information to query a third host, and so on. This is a time consuming process and leads to low agent efficiency. Further, the agent must know the proper sequence of accessing the hosts or the agent will not have the necessary information on hand when accessing an application and, therefore, will not be able to obtain the needed information from the host.

Therefore, there is a need for a method and an apparatus for automatically accessing a plurality of information sources in a manner and in the order necessary to obtain the desired information.

Agents interact with customers/clients on the telephone and there is typically some information associated with that customer. For example, on an outbound call, the call record usually has a minimum of the customer name, customer telephone number, and how to contact the customer. In addition, there may be a detailed history or various other information about the customer. All of this information may assist the agent in providing the desired service to the customer while the agent is on the telephone with the customer.

In a client-server system, there are numerous information sources where the agent can obtain information about the customer. For example, a mainframe owned by the user, information from a credit bureau, or an image server showing pictures of products or customers, or signatures of customers, etc. Other information may be residing in data bases on a network or in other places, some of which may be remote and only accessible via modem. Such information could be a text form, an image form, a graphics form, or in another different media type. These different information sources are typically not compatible with each other and, further, have no common method of information display. Of course, the agent may be able to "hot key" from one application to another application so as to sequentially communicate with several different information sources and view all of the desired information. In some cases, the agent may have to quit the current application program and launch another application program to get information about that customer. In cases where there is not a "shop license" for the application program, an application program may be installed on some agent stations, but not installed on others. Therefore, one agent might have to transfer the customer to another agent who has the necessary application program.

Also, consider the case where the user has a mainframe information source, with multiple Legacy™ applications where the applications have a dumb terminal interface. The user may want to upgrade to a different mainframe or different application programs so as to be able to store more information, or more types of information, etc. In the past, the user had two choices: pay someone to re-enter the data for the new applications program, and take the chance that data may be lost and/or incorrectly entered; or simply forego the use of the old application/database and the information stored therein. The mainframe applications are costly and extremely time consuming to change or create from scratch. The user therefore often has a substantial investment in the applications and the data stored under those applications so the user will not want to lose that investment.

In order to provide quality service to the customer the agent may need to have access to some or all of the information, regardless of whether a Legacy™ application and/or some other application is being used, and regardless of the media type associated with that information. Further, the information should be presented to the agent in a consistent format so that the agent does not have to visually scan the screen trying to find the desired information.

Therefore, there is a need for a system which provides a uniform set of screens to the agent. That is, a system which combines and presents various types of desired or required information, regardless of the media, from various information sources to the agent in such a way that the screen displays appear to the agent as if provided by a single system. The fact that several information sources may be involved in providing the desired information displayed on the screen is not apparent to the agent, regardless of the physical platforms on which the information resides, or where these platforms are located,.

In the past, the agent had to manage multiple information sources by using a different screen or image for each source, and using various function keys, in order to obtain the desired information. For example, the dialer would obtain call record information from the host and would provide an initial screen to the agent. Then, if the agent needed additional information to service the customer then, typically, the agent would press a "hotkey", which would cause the agent's station to switch from the view provided by the dialer to a view provided as an emulation of a dumb terminal connected to the host. The agent would then see the screen provided by that information source or application. The agent could hotkey back and forth between the host and dialer screens as necessary. The agent or the station program could also cut and paste between screens, in the background, so that if the agent obtained the account number from the dialer screen the agent could hotkey, with the account number, to the screen provided by the host, tab or index over to the account number field on the view provided by the host application, and then insert the account number into that field on the host application and thereby cause the host to bring up and display the associated account record. If there are multiple host applications involved then there are multiple function keys, each hotkey invoking a different one of those applications. The agent therefore saw a different image each time that the agent was communicating with a different host. Each image that the agent saw, and the data that the agent saw, was at the discretion of the programmer who originally wrote that application and decided what information was to be presented on that screen, and in what format. To properly service a customer, the agent would have to go to different applications, or different pages within an application, to find the data or the necessary or desired information. Even then, some or most of the data fields presented may not be relevant to the problem that the agent is attempting to address.

Similarly, the agent may need to enter certain information into the various information sources and applications. Again, the agent has, in the past, had to hotkey between various applications so as to enter the information into different information sources, or the station entered the information only into a single host application program. This can lead to errors, where the agent does not type in exactly the same information into each information source, omissions, where the agent forgets to update an information source, and substantial losses in time and efficiency where multiple hosts and/or application programs must be updated individually.

It is well known to link similar programs together, such as over a network. An example of such is a company spreadsheet which must reflect the status of several departments. Each department may have its own spreadsheet, and the company spreadsheet will be linked to selected items, such as income, expenses, net profit, etc., in each department spreadsheet. Thus, a change in the spreadsheet in any department will automatically update the company spreadsheet when it is opened. However, the application programs running the various spreadsheets must be identical or designed to be compatible, something which cannot always be assured when working with, for example, a department purchased from a different company. That department may use computers and/or spreadsheet application programs which are not compatible with the computers and/or spreadsheets of the company. Likewise, in a call center, the different sources of information may use different computers and application programs, and may be incompatible. Therefore, there is a need for a method whereby information from various sources, even those which are mutually incompatible, is consolidated and presented in a uniform manner.

To be useful, a process must be simple to use. Therefore, most of the operation of the process must be transparent to the agent. That is, the agent must not need to know what host to access, what information to obtain, or the order of accessing the hosts.

Therefore, there is a need for a method for consolidating information from multiple sources into a single, user-definable, coherent set of screens.

There is also a need for a method for sequentially linking information sources so that an entry or an information update into a single information source, via a user defined and customized set of screens and/or information fields, automatically accesses related data or information in other sources, even when the information needed to access those other sources is not known to the agent.

There is also a need for a method which allows an agent to update an information item in all relevant information sources without the agent having to hotkey between applications, or individually select the information sources for updating. This method should run in the background so that a change in an information item on user customized screens, automatically updates all of the relevant sources.

Another limitation of the prior art is that the access time for some sources is quite long, easily reaching several seconds, and sometimes even more. When the agent switches to any such slow source to obtain information there will be a noticeable time lag while that slow source responds to the query and provides the desired information. This time lag reduces agent efficiency. This time lag may also be irritating to the customer who must wait until the slow source has provided the requested information to the agent. This time lag can be especially distressing to a customer if the agent must access several slow sources in order to obtain all of the information necessary to service the customer. Therefore, there is a need for a method to eliminate this delay time.

SUMMARY OF THE INVENTION

The present invention provides a method and an apparatus which allows the agent to obtain the desired information from a plurality of information sources quickly and automatically through the user customized application program.

The present invention provides a method and an apparatus which automatically accesses various types of information (voice, fax, image, audio, etc.) from specified sources when an item of information is desired.

The present invention provides a method and an apparatus for automatically accessing a plurality of information sources in a manner and in the order necessary to obtain the desired information.

The present invention provides a method and an apparatus which allow a person to quickly and simply define a process and the steps in the process without the need for a skilled computer programmer.

The present invention further provides for a uniform screen/display presentation design by the user, which is independent of the source, the information types, and the application program which is providing the information or which is accepting the data entries and other types of information.

The present invention provides a method for consolidating the information from multiple information sources so as to provide a user-defined, uniform set of screens to an agent. All of the information sources required by application session may be, and preferably are, automatically linked and accessed in a coherent manner, which is defined by the user. Entering a data item into one field of one information source automatically accesses related information from the other information sources thereby eliminating the need for the agent to switch between information sources. Further, the user may present the information from the various information sources in a uniform manner so that a given item of information preferably appears at the same location on the screen, in the form and with the look designated by the user, regardless of the application, the display format that is used by the information source, or the type of information involved (fax, text, image, picture, spread sheet, etc.). This eliminates the need for the agent to search among the different screens and sources to find the desired information. In accordance with the present invention, all desired information from multiple sources is linked and combined into a Single System Image View™ so as to eliminate the need for the agent to directly access these various sources and items of information.

An information source is selected that will provide and/or receive the information and a location on the screen for the information that is selected. Then the record type that is involved is selected. Then, for example, a particular data entry field that is involved is selected. A determination is then made as to which data field from a first information source is to be used to access information in a second information source and that information is then linked from the first information source to the second information source. Then, for example, a determination is made as to how the information obtained from the second source is to be used. Then a determination is made as to whether the desired agent screens have been completely defined and updated with the desired information. If not, then the process is begun again and repeated until all information sources and all desired information have been accessed and displayed as desired. The linking and accessing are not limited to operation on text information, but include operation on other types of media, such as fax, voice, pictures, etc. Therefore, a uniform presentation is provided to the agent, regardless of the media type in which the information is stored or presented.

The present invention allows the user to define objects, such as items, screens, icons, pull-down menus and windows, software buttons, etc. The user can define an object, the appearance of an object, the location of an object, the function of an object, and whether that function is performed automatically or at the initiative of the agent. An object may be defined by the user to access and display a reduced amount of information from one or more sources, if desired. Then, if the agent selects the appropriate button, or icon, or function key, then the present invention will access and display additional information, which is defined by the user and is displayed at the location defined by the user. The user may define a set of screens, and the information displayed will appear on the screen or screens designated by the user.

One aspect of the method of the present invention includes defining a first data entry field, defining a first information source, defining a first data/information item from the first information source to be displayed at the first data entry field, defining a second information source, defining a first data item from the second information source, causing the first data item from the first information source to be used as a key, or index, or data input entry for the first data item of the second information source, defining a second data entry field, and defining a second data item from the second information source to be displayed at the second data entry field.

Another aspect of the method of the present invention includes receiving a data entry item at a first data entry field, sending the data entry as a first data entry item to a first information source, receiving a second data entry item from the first information source, sending the second data entry as a first data entry item to a second information source, receiving a second data entry item from the second information source, and displaying the data entry item.

Another aspect of the method of the present invention includes receiving a data entry item at a first data entry field and sending the data entry item to a first information source, receiving a second data entry item at a second data entry field and sending the second data entry to a second information source.

Another aspect of the method of the present invention includes receiving data entry items at a first set of data entry fields and sending these data entry items to a first information source, and receiving data entry items at a second set of data entry field and sending these data entry items to a second information source.

Another aspect of the method of the present invention includes receiving information from a first source and displaying this information at a user-defined location on a screen, and receiving information from a second source and displaying this information at a user-defined location on a screen.

Another aspect of the method of the present invention includes receiving multiple items of information from a first source and displaying this information at user-defined locations on a screen, and receiving multiple items of information from a second source and displaying this information at a user-defined locations on the same screen or on different screens of a set of screens.

Another aspect of the present invention is that various types of information can be displayed, and received from and sent to different sources. For example, the information may be text with respect to a first source, the information may be graphics with respect to a second source, the information may be facsimile documents with respect to a third source, the information may be video with respect to a fourth source, the information may be audio with respect to a fifth source, and so forth. The information is in the format necessary for communication with the particular source and is displayed on the screen in the location and form defined by the user. Thus the user can select what media type is most useful for providing the information to the agent for the job to be performed, and where and how that information is to be displayed or otherwise provided, such as audio or image information.

Thus, the user can define what information will be displayed on the screen, and on which screen or a set of related screens, where on the screen the information will be displayed, and whether the information is to be sent to a source, received from a source, or both. The user can also define what name or other label will be assigned to the screen display field, regardless of the name that field may have in other applications or information sources. The user can further define where a field is to be sent. For example, a field labeled by the user as: "Promise to Pay Amount" may be sent to (written to) source 1, but another field, labeled by the user as "Address" may be sent to source 2, or to both sources 1 and 2, or to any other desired sources. Such distribution of the information is automatic and is transparent to the agent. Therefore, the present invention provides for automatic routing, distribution, and delivery of information to multiple sources.

The user can thus define the "look and feel" of the system and therefore the steps or procedures that the agent must learn in order to properly service the customer. The user or administrator thus controls what the agent must know and ensures that the agent does not need to directly access the information sources or have to scroll through the information provided by any information source. The user has defined the information that the agent needs to service the client and that information is immediately and conveniently provided to the agent via a uniform set of screens. This eliminates the time that the agent has wasted, using prior art systems, searching to find the right source of information and scrolling through the information to find the desired item of information.

The present invention thus provides for combining information from various sources into a set of displays which appears as if it comes from only one source. This is sometimes referred to herein as a "Single System Image View"™, which is a trademark of Melita International Corporation, Norcross, Ga.

As the present invention provides for combining information from multiple sources into the Single System Image View™ and the agent can see and/or hear the desired information, the present invention further addresses the need to provide for access to additional information from each of the new formed information fields within the Single System Image View.

For example, information from multiple sources may be combined into a new information screen, or set of information screens, called "Customer History". The new screen(s) may typically have one small set of information displayed at all times, such as the most recent payment history of the customer. That information may be from multiple sources as the customer may have several different accounts (credit card 1, credit card 2, car loan 1, car loan 2, mortgage, personal line of credit) with one creditor, such as a bank All of these sources could be important because there could be a delinquency in one account, but not in another account. Note that, in this case, the information for any account may be completely independent of the information for any other account, even for that same customer, and so the information is considered to be coming from multiple sources, even though all of the accounts may be present on, and the information coming from, a single host computer at the bank.

Only a limited amount of information can be displayed on any window or screen, so there is now a requirement for enhanced accessibility to other information. The present invention therefore provides for allowing the agent to view additional information by clicking on a specific field using a mouse, by moving a cursor on the screen to a specific spot or area or field on the screen, or by some other action. For example, if a field is labeled "Customer Delinquency" or "customer Payment Record", then moving the cursor to, or clicking on, or otherwise designating that field will bring up the underlying information associated with that field. Each such field has associated with it a set of user-defined information items and designating that field initiates links to acquire and present those information items. Thus, the action of designating a field automatically brings up a screen, or a set of screens, which has the user-defined information, such as a full account status report or a delinquency report for that customer. This allows the agent to easily and quickly bring up detailed information during the conversation with the customer without the need to directly access each host or application.

This information is acquired and presented to the agent in real-time, that is, while the agent is conversing with the customer, and the information is on-line, that is, the information being presented to the agent and updated by the agent is the current information in the source. The present invention allows the details of each item of information to be specified independently of any other item of information, so information may be acquired real-time and on-line from multiple sources, the information may be received in different protocols, may come from multiple hosts, may be of different media types (fax, text, voice, picture, etc.) ,and may be transferred via different network systems.

The present invention thus: allows the user to define the information that is necessary for the agent to properly and instantly service the customer in different environments, such as sales, collecting information, status inquiries, customer services, etc.; allows the user to define various information windows or fields; allows the user to combine information from multiple sources into a single screen or a coherent set of screens, that is, a Single System Image View™; provides the ability for the agent to read, see (in the case of pictures or graphical representations), hear (in the case of audio information and messages), type, write and deposit information from and to multiple sources; and provides the agent the ability to process and communicate information in different media forms without having to know which application is necessary for any particular media form. The present invention provides the above as part of a program application which may run either in the foreground or in the background, and is transparent to the agent.

The present invention provides a method for instantly providing an agent with information, even when that information must be obtained from a source or sources which have a slow response time. When a list of outbound calls to be placed is created or downloaded, the present invention provides for contacting the desired sources, in advance of or approximately concurrently with, the placement of the outbound calls and requesting user-specified information. This desired information is combined, in the manner specified by the user, and stored in a database, for example in the dialer database. This information may include text, data, and objects, such as pictures and audio. Once an outbound call is answered by a called party and connected to an available agent, then at least some of the information in the dialer database for that outbound call is sent to the agent's station. The agent's station then accesses this database to obtain and present the user-specified information for the agent. Thus, when the outbound call is connected to the agent, the agent immediately has the information necessary to service the customer, even when that information was obtained from slow sources. In most cases, the information originally provided will be current, especially if the information was requested approximately concurrently with the placement of the outbound call. However, there will be cases where the information has changed, especially if the information was obtained substantially before the outbound call was placed. In such cases the user may specify that, after the station presents the information from the dialer the station will access the sources which originally provided the information and request that information, so as to assure that the agent has the current information. The station will then present that information to the agent. Thus, the agent is immediately provided with information regarding the customer and is further quickly updated with the current information regarding the customer.

Other objects, features, and advantages of the present invention will become apparent upon reading the following description of the preferred embodiment, when taken in conjunction with the drawings and the claims.

BRIEF DESCRIPTION OF THE DRAWINGS

FIGS. 2A–2J illustrate the process of the present invention whereby an application program is created.

DETAILED DESCRIPTION OF THE INVENTION

Figure 1:
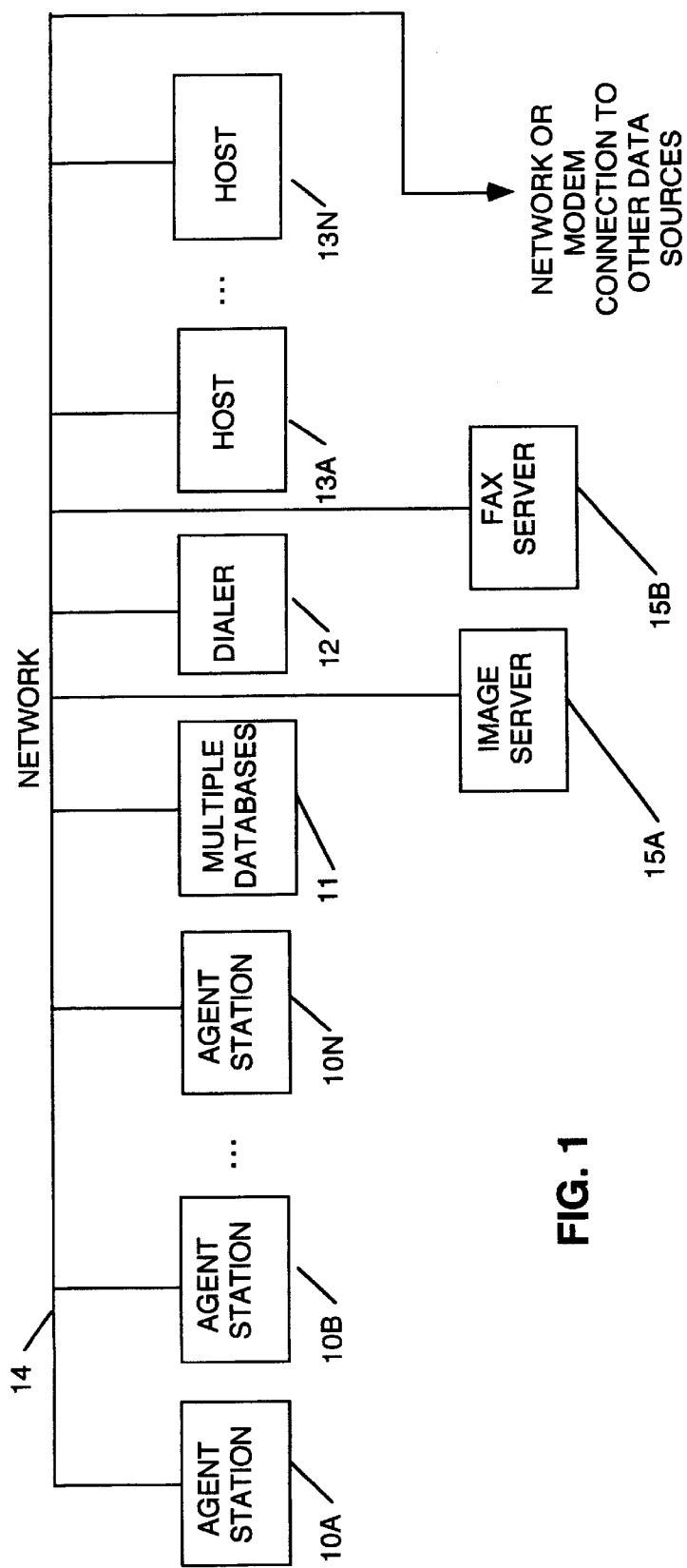
FIG. 1 is an illustration of an exemplary environment of the present invention.

Turn now to the drawing in which like numerals reference like components throughout the several figures. FIG. 1 is an illustration of an exemplary environment of the present invention. Many different environments are contemplated by the present invention, depending on the service or services that are being offered. Therefore, the environment for use of the present invention in a marketing organization may be different than the environment for use in a collection organization, or an insurance organization, or a credit granting organization, or a banking organization. Therefore, the sources in which the information are stored and the methods by which the sources are accessed may vary greatly from environment to another environment. A plurality of agent stations 10A–10N are connected via a network 14, to each other and also to a database server 11, which preferably contains multiple databases, a DIALER 12, and one or more hosts 13A–13N. Network 14 may be, or may be connected to, a local area network (LAN), a wide area network (WAN), a dial-up network, or another type of network. In this example, these components are connected so as to form a call center which handles both inbound and outbound calls. An example of such a call center is shown in the following U.S. Pat. Nos.: 4,797,911; 4,894,857; and 5,214,688. The stations 10 preferably comprise a monitor for allowing the agent to view information, a keyboard and mouse for allowing the agent to enter information, and a headset or other audio communications means for allowing the agent to hear audible types of information (words, music, etc.) and to communicate with the customer. It will be appreciated that other components may be necessary for one organization, and some of the components shown will not be needed for another organization. For example, an organization that handles mostly or only inbound calls may not require a dialer, but other types of organizations may require the support of different servers 15, such as an image server 15A or a facsimile server 15B. An agent station 10 preferably comprises a telephone handset or headset so that the agent at the station can communicate with another party, a keyboard for the entry of data by the agent, a display for the presentation of information to the agent, and a computer, such as a '486-based personal computer. The general design and construction of agent stations are well known in the art. The database may be any device or group of devices, such as computers or stations, which contains information, such as another personal computer which has information, such as text, graphs, pictures, e-mail etc., stored in it. The DIALER 12, if needed to implement the services of an organization, is preferably a PhoneFrame® DIALER, manufactured by Melita International Corporation, Norcross, Ga. PhoneFrame® is a registered trademark of Melita International Corporation. The hosts 13A–13N may be any host which has information which is useful or necessary to the proper handling or disposition of the call. The agent stations 10A–10N are also connected by the LAN 14 to a network or modem to other information sources, which may be located in a different part of the country.

Assume, for example, that the call center of FIG. 1 is an inbound call center, that is, parties call into the call center to order or obtain information on products or services. Assume also that the information that the agent will most often readily obtain from the calling party is only the name of the calling party. Also assume that the complete information on the calling party is, for whatever reason, spread out among several different information sources. In order to assist the calling party/customer, the agent will want to access HOST1 to obtain the account information (name as listed on the account, address, telephone number), will want to access HOST2 to obtain the current account status (credit limit, balance, paid in full, timely, late, no credit, closed, etc.), and will want to access the DATABASE to obtain the current order status (date of order, products/services ordered, price, date shipped or to be shipped, a picture of the item ordered, a picture of the signature of the person authorized to use the account or to make payments on the account, etc.). Once this information is presented to the agent, which information may be conveniently presented via several screens rather than one screen, the agent will be in a position to properly and speedily service the calling party.

However, assume that the HOST2 can only be accessed via the account number, and that the DATABASE can only be accessed if the customer's social security number is known. Therefore, to present the desired complete information to the agent, the NAME of the calling party is used to access HOST1 to obtain the proper name, address, and account number of the calling party. The account number obtained from HOST1 is then used to access HOST2 to obtain the current account status. Finally, the social security number obtained from HOST1 is used to access the DATA-BASE to obtain the current order status. Manually implementing this process would require the agent to switch from information source to information source, and to try to keep the necessary information on hand in order to access one information source by using the information obtained from another information source. However, the present invention links all of the information sources together in a manner defined by the user so that the entry of one piece of information may be adequate to immediately pull up the information from all of the information sources, and the present invention also combines and presents the user-specified, desired information obtained from the information sources in the manner and form (text, graphics, pictures, etc.) desired by the user.

For convenience, the program that is used to create the application program is called the "builder" program. The builder program is constructed using an object oriented language program, such as C++, SMALLTALK™ by Digitalk, or other similar programming language. The object oriented language program is used to define the objects which are to be used in the builder program, and to define the different graphical widgets that are to be used in the builder program. Some examples of graphical widgets are software "buttons", option "buttons", "radio buttons", menus, check boxes, list boxes, dialog boxes, icons, etc.

The first step in the present invention is to define, by programming, an object which identifies the sources of information. For example, in FIG. 1, hosts 13A–13N would be information sources, and DIALER 12 would be another information source. Database 11, if it contains information that is needed, is also listed as an information source. Likewise, an agent station 10 can be a source of information if it contains information which is desired and not readily available from another source or sources. Then, any other sources (PBX/ACD phone system, fax server, image server, etc.) connected to the LAN 14 are identified. The identification of a source involves specifying the name of the source and how to contact the source, that is, the address of the source such as the port number to which the source is connected, the telephone number if the source is a dial-up source, a network identification number if the source is on a network, etc. The type of protocol for information transfer by that information source is also identified. For example, to access a database, one may select Open DataBase Connectivity (ODBC), or Structured Query Language (SQL) type protocol. To access HOST1, one may select Systems Network Architecture (SNA) 3270 protocol, etc.

The next step is to define, again by programming, a sub-class of objects, one for each information source. Each object in the sub-class is concerned with communicating with one defined source. For example, one object in the sub-class will be concerned with communicating with the DIALER 12. For example, the DIALER 12 may have data fields for a customer name, a customer account number, a customer address, and a customer telephone number. The object concerned with the DIALER 12 will identify the different information fields that are used by that information source.

The host 13A may have this same information, plus information on the last order and previous or historical information. The host 13N may have a customer name, a customer account number, a customer address, a customer telephone number, and the credit limit of the customer and the customer's present balance. Other sources of information may contain some of the same information, and some additional information, such as the customer's credit and payment history, preferred language, employer, etc. Also, the customer may have multiple accounts and therefore access to multiple sources of information may be needed.

Once the information fields are identified, the next step is to define, again by programming, a sub-sub-class of objects. Each object in the sub-sub-class is concerned with accessing one defined information field. This object thus contains the delimiters necessary to position to and access a particular field. For example, a carriage return and a tab, or two tabs, or CONTROL+Y, etc. In some cases, such as where the host application is expecting a dumb terminal, a process of "screen scraping" may be necessary. Screen scraping is the process of identifying each character on the display, by row and column, and specifying whether that character is a label character, such as "NAME", or a data entry character, such as "John Q. Brown". Spaces and carriage returns or line feeds are then used to move to the desired position on the original host display to read the character or to write the character to the host. Similarly, imaging, graphic, etc., information is also defined in terms of types. For example, the information may be pixel information, or may be via an X11 protocol, or may be an OLE exchange, etc., so that non-text/non-ASCII information can be transferred and displayed/presented at the agent's station, as desired. For example, using the DATABASE as an information source, the information table is defined including any existing relationships between table elements. Then, the information (text, pictures, images, audio) is extracted.

The different classes, sub-classes, and sub-sub-classes, etc., of objects are linked together so that selecting an object of a class causes the sub-class of objects under that object to appear. Likewise, selecting an object of a sub-class causes the sub-sub-class of objects under that object to appear.

Further, the topmost class need not know the specifics of the communication involved. The topmost class need only know the source desired and the item of information desired. The lowest class is concerned with the specifics of communication with the desired source. Therefore, the different classes of objects use a common language or protocol to exchange information among themselves, and only the lowest classes of objects are concerned with the details and protocol necessary to interface with the desired source or application program. Thus, the visual layer can present and receive information in any desired, convenient form, and the process of converting this information to/from the form used by the source is accomplished by a lower layer object. This allows the use of a uniform set of screens and/or media to convey the information to, and receive information from, the agent.

In addition to the source-related objects above, any objects necessary to define the screens are selected. Thus, the desired graphical widgets are selected, such as the buttons, windows, menus, etc.

This compilation of source-related objects and graphical objects make up the builder program. The builder program is preferably installed on an agent station 10 which has been designated for use as a supervisory or managing terminal and/or a downloadable server or dialer. However, any agent terminal 10 or dialer 12 may be used to run the builder program. The builder program is, for example, preferably installed on a 486-based, 66 MHz IBM-compatible personal computer which operates as a station running graphical user interface software. The builder program is then used to create the interpreter application program. The interpreter application program created is preferably run under WINDOWS™, UNIX, OS/2, or another operating system.

Through station application programming interfaces (API's), dynamic data exchange (DDE), object linking and embedding (OLE), dynamic link library (DLL), and other well known techniques, many sources may be linked together to form a Single System Image View.

FIGS. 2A–2J illustrate the process of the present invention whereby an interpreter application program is created to automatically, quickly, and easily accomplish the desired process. The builder program, when started or opened, presents a window that has a toolbar for the user and a blank screen for the user to create the application program. The toolbar has the graphical widgets described above. The user then begins to create a window for an application program by selecting and dropping graphical objects onto the window. By opening an object or selecting that graphical object for editing, the user can view and modify the attributes for that screen object.

Figure 2A:
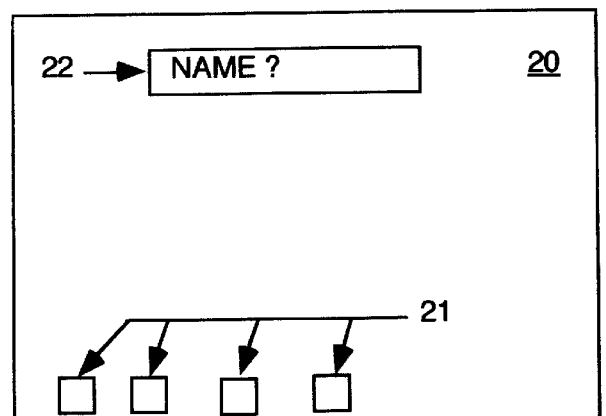

In FIG. 2A, the builder presents a screen display 20 which represents the screen or image which the agent will see. The screen display 20 preferably also includes user-defined graphical widgets such as an add button, a delete button, data entry field button, icons, symbols, list boxes, check boxes, dialog boxes, etc. These graphical widgets 21 may be conveniently placed at any location on the screen 20, or may be placed on a toolbar displayed on the screen 20. As is well known, graphical widgets, such as software buttons, are generally selected or "pressed" by moving a cursor over the display for the widget and then clicking on a mouse or pressing a key. For convenience of illustration, these widgets 21 are generally not shown on the other figures. The functions may also be called by means of a pull down menu. When an application is being created, the builder will automatically ask, via a dialog box 22, the user to name the application that is being created. The user, for example, a system manager then types in the name of the application that is being created, for example, "SCH4".

Figure 2B:
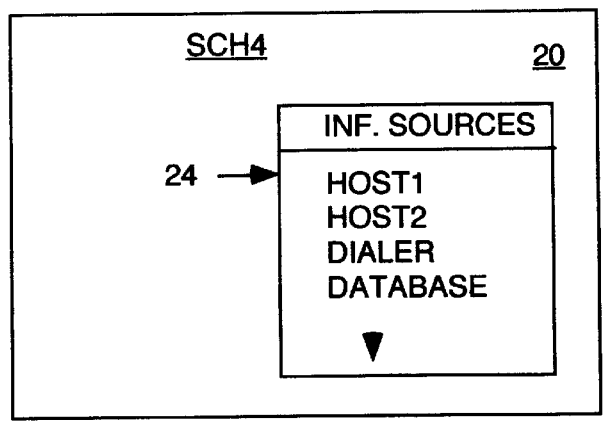

In FIG. 2B the builder then asks the user to declare the information sources that will be used in this application by presenting a dialog box 24 which has a list of the previously defined information sources. The arrow at the bottom of the list allows the user to scroll down (or up) to other information sources when there are more information sources than will conveniently fit on the screen display 20. For example, scrolling down using the arrow will allow the user to view other sources such as the image server 15A and the fax server 15B. The user then selects or designates the desired sources for this interpreter application program by clicking on a desired source, or by clicking on that source and then clicking an "Add" button 21. This process selects the object previously defined (programmed) for that source. Other methods of source designation may also be used.

Figure 2C:
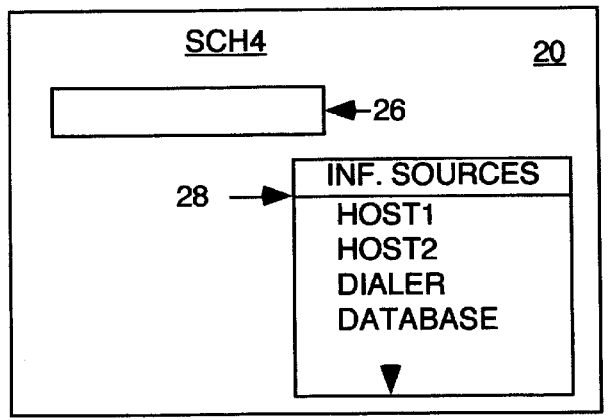

In FIG. 2C the user clicks on a data entry button 21 to create an entry field 26 on the display screen 20. The user may "drag and drop" such entry field 26 to any desired location on the screen 20. The builder will then ask what the user wants for that field. In this case, assume that the user wants the agent to be able to input the name of the calling party. The user will therefore click on a "write to variable" button 21. The builder will then ask where the user wants to write the information that will be placed in that field, such as by presenting a dialog box 28 which lists the available information sources, i.e., the information sources identified in FIG. 2B. The user then selects the desired information source, e.g., HOST1.

Figure 2D:
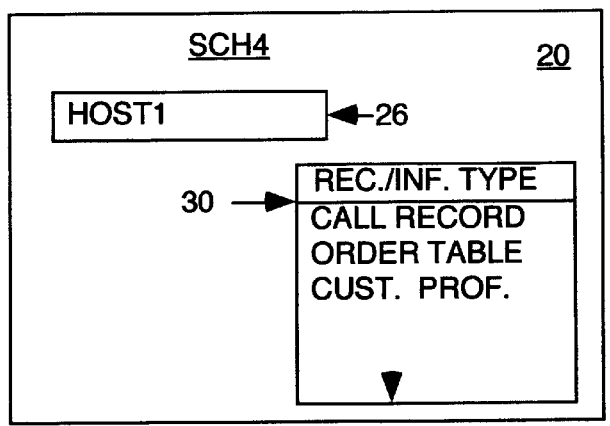

The builder then, in FIG. 2D, responds with a dialog box 30 which lists the different information types available from that host. For example, HOST1 may provide call records, order tables, customer profile, etc. The user then selects the desired information type, e.g., call records.

Figure 2E:
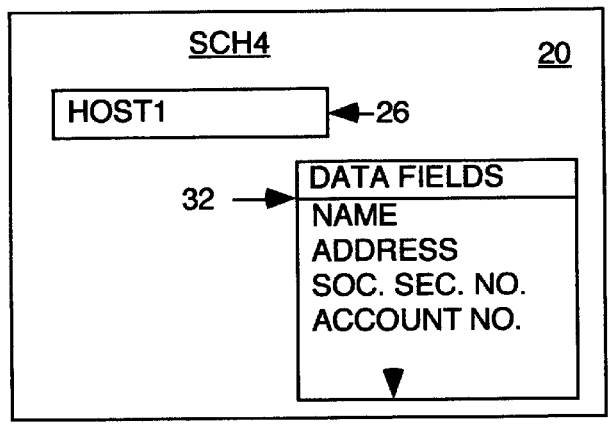
Figure 2F:
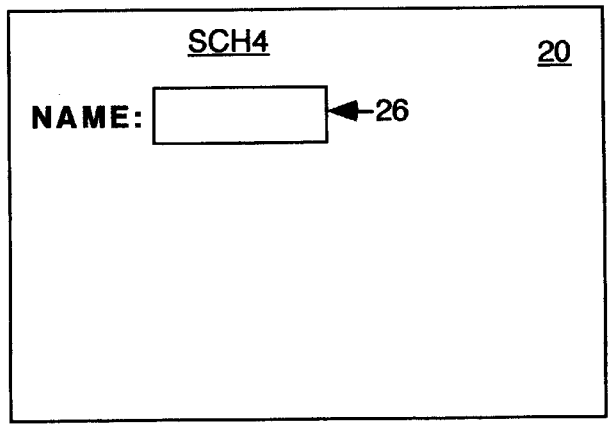
Figure 2G:
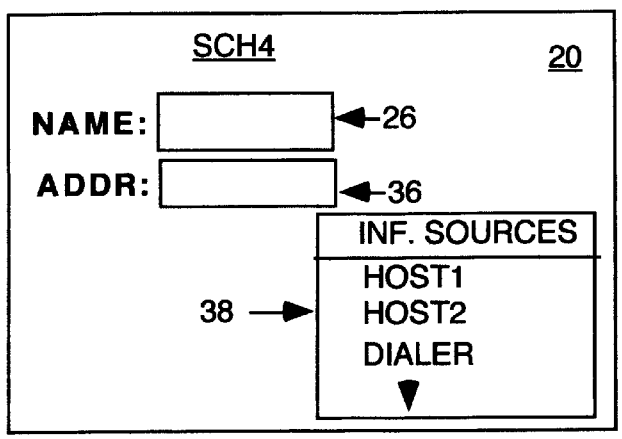
Figure 2H:
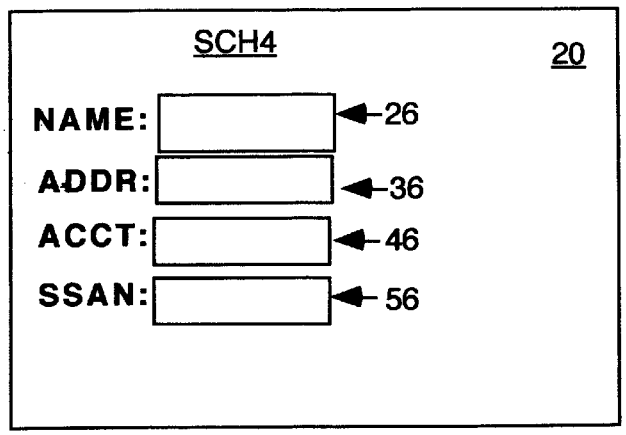

The builder then presents, in FIG. 2E, a list 32 of the different data fields available under that information type. The user then selects the desired data field, e.g., NAME. The user may also specify a label that is to be presented with the data entry field 26 by clicking on the field 26 and then pressing a "label field" button 21. In this case, the user would label the data entry field 26 as "NAME:", as shown in FIG. 2F.

When the agent types in the name of calling party and presses return, or clicks "enter", or takes some similar action, the application will take the name in the data entry field 26, attach the necessary control characters, and then send the entry as a query to the HOST1. The HOST1 will return the information associated with that data field to the agent station 10. Some of the information may not be necessary for the particular job. Therefore, the user specifies what information from HOST1 is to be used, how it is to be used, and where it is to appear. In the example given, HOST1 contains the name as listed on the account, the address, and the telephone number. Also, when the HOST1 returns the name as listed on the account that name will automatically be displayed in the data entry field 26. Therefore, the user does not need to take any further action to display the name as listed on the account.

In FIG. 2G the user again clicks on a data entry button 21 to create another entry field 36 on the display screen 20. The builder then asks what the user wants for that data entry field 36. In this case, assume that the user wants the agent to be able to see the address of the calling party. The user will therefore click on a "read from variable" button 21. The builder will then ask from where the user wants to read the information that will be placed in that field, such as by presenting a dialog box 38 which lists the available information sources, i.e., the information sources identified in FIG. 2B. The user then selects the desired information source, e.g., HOST1. The builder will then respond with another dialog box, as in FIG. 2D, which lists the data types. The user then selects the desired data type, e.g., Call Record. The builder then responds with another dialog box, as in FIG. 2E, which lists the different data fields available under that data type. The user then selects the desired data field, e.g., ADDRESS.

This process is then repeated for the ACCOUNT NO. and SOCIAL SECURITY NO. fields, so that data fields 46 and 56 are created therefor. The display then appears as in FIG. 2H. Fields may also be added for other desired information, such as a work permit number, or a customer invoice number.

Figure 2I:
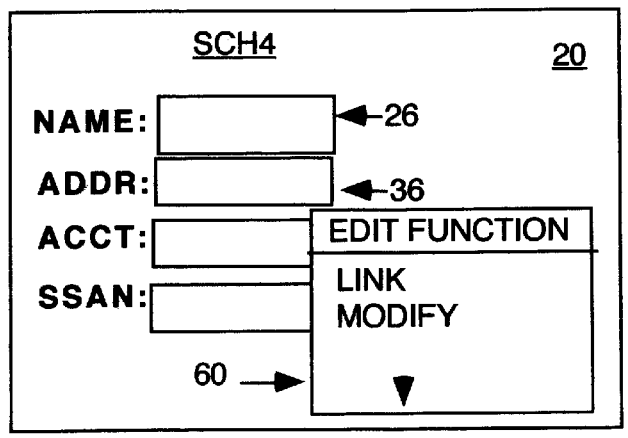

Now, recall that the HOST2 can only be accessed via the account number, and that the DATABASE can only be accessed via the social security number. The account number and the social security number have been obtained from the HOST1. FIG. 2I illustrates how the user uses the information from the HOST1 to access the HOST2 and the DATABASE. The user specifies that a change is to be made to the ADDRESS data entry field 36. This may be done by clicking on the data entry field 36, which causes a dialog box to appear, or by pulling down a menu, selecting "edit", or by pressing a button 21, and then selecting the data entry field 36, or by any other manner which is convenient. The builder will then present a dialog box 60 which asks the user to select the change; e.g., modify, link, etc. In this case, the user will select the LINK option and then click on the "write to variable" button 21. The builder will then ask where the user wants the data field to be sent, the record type, and the data field, and the user will respond accordingly, in the same manner as described with respect to FIGS. 2A–2E. When the program has been installed in the agent station 10 then, when the HOST1 returns the specified information, the application program will extract the ADDRESS field, attach the necessary control characters, and then send the ADDRESS field as a query to the HOST2. The HOST2 will then provide the information associated with that ADDRESS field data entry to the agent station 10. Thus, the agent station now has access to the information in the HOST2. Some of the information may not be necessary for the particular job. The user then specifies what information from HOST2 is to be used, how it is to be used, and where it is to appear on the screen 20.

This process is then repeated for the SOCIAL SECURITY NO. field and then accessing the DATABASE.

The user may also create other data field boxes, buttons, icons, pull-down windows, display areas, designate other information sources, etc., as above, for as many different types of information sources and different hosts, databases, application servers, etc., as the user deems necessary for the particular job or campaign being designed. The user is not limited to a single screen display. In the preferred embodiment, a screen display comprises several pages, each one of which may specify some of the same data entry fields, hosts, database fields, etc., and some different data entry fields, database information, images, graphics, etc. The agent can then move between the different pages using the user-defined buttons 21, icons, function keys, and/or symbols, as necessary to see the information that is necessary to service the client at hand. In some cases, it may be desirable to set up data entry fields for each data entry which will be coming from an information source. However, the present invention allows the user to arrange those fields in a consistent manner and in the manner deemed most useful. That is, the user designing the screen layouts need not keep the entire set of information, or keep the information in the order provided by the information source, even if it contains all of the desired information. The user can rearrange the data entry fields in the order and fashion desired by the user, the user can link any of the information fields to other information sources, and the user can display information fields from different types of information sources. The user therefore has complete freedom to define and arrange the data entry fields, graphical displays, fax information, etc., necessary or desirable to service the client.

Figure 2J:
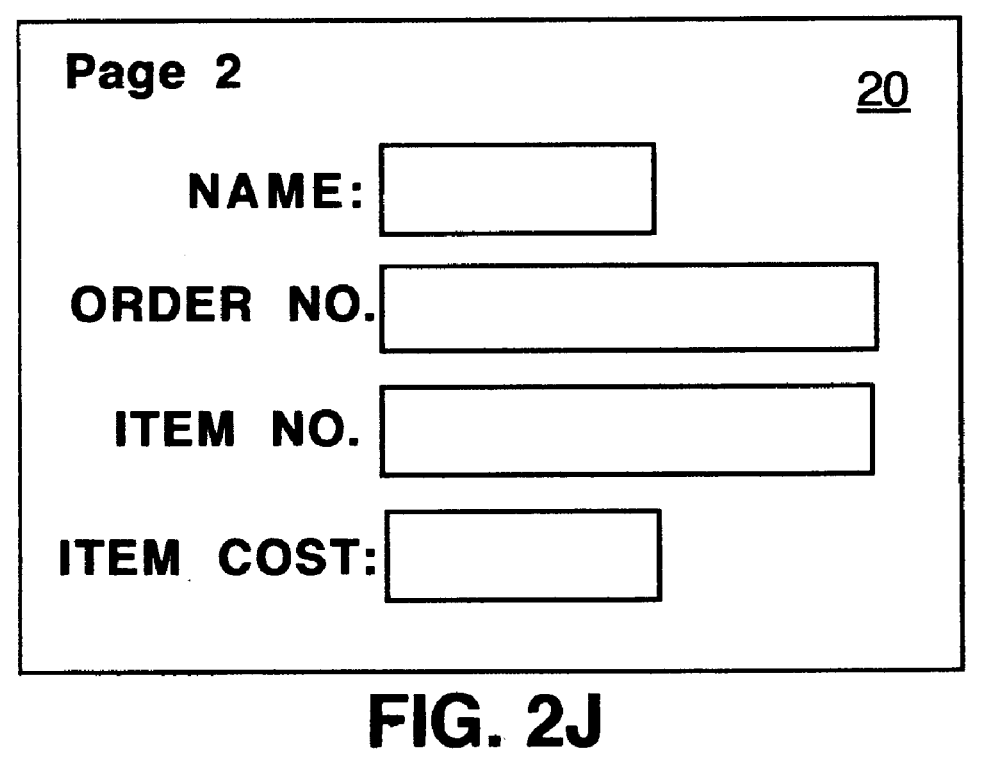

FIG. 2J is an example of a second page containing additional information. This screen display is created in the same manner as above for the first page. The user then saves and closes the interpreter program. The interpreter program is then installed in each of the agent stations 10 of FIG. 1.

Although the example above has been concerned with sequentially linking various sources, the present invention is not so limited. For example, if the same index can be used for several sources, then the sources may be accessed in parallel, so that the same index is sent to several sources and the user is not dependent upon the return of one item of information from one source in order to access another item of information from another source. Likewise, if more than one index is available, such as the telephone number and account number in the case of an outgoing call, then each index may be sent out, independently of and/or in parallel with the other indices, to the appropriate source(s) so as to access the desired information in those sources. In this context, the word "sequentially" means that information must be obtained from one source before other information can be obtained from another source, and "parallel" means that information from one source can be obtained independently of whether information has already been obtained from another source. Also, it will be appreciated that each information field has certain attributes, such as the sources which have or are to receive the information items, the addresses of the sources, the commands necessary to input or receive the information items, etc.

Figure 3:
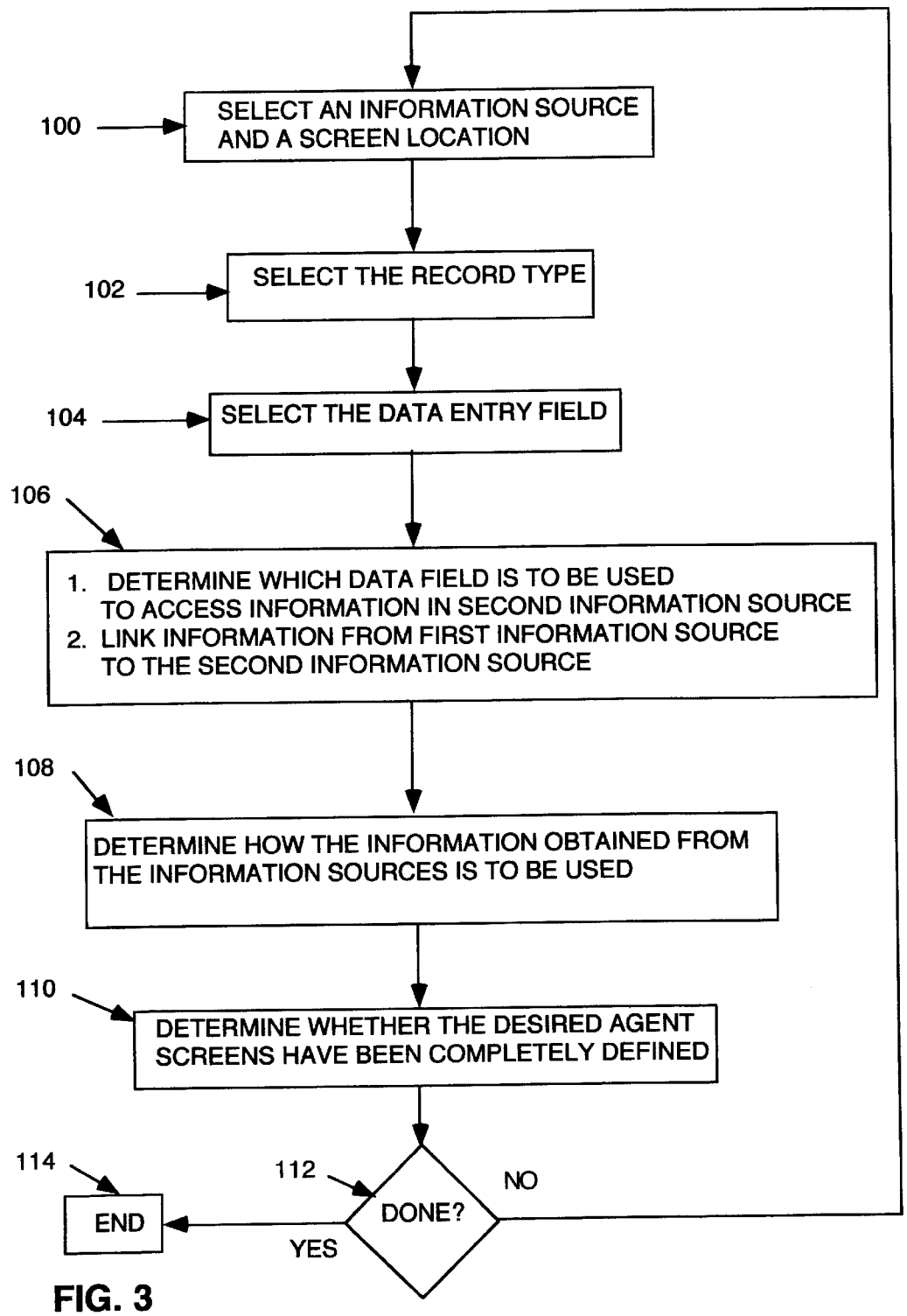
FIG. 3 is a flow chart summarizing the process of FIG. 2.

Therefore, the process of creating the interpreter application program may be briefly viewed as involving several steps, summarized below and illustrated in FIG. 3. Step 100 is to select an information source that will provide and/or receive the information. Step 102 is to select the record/information type that is involved. Step 104 is to select the particular data entry field that is involved. Step 106 is to determine which data field from a first information source is to be used to access information in a second information source and to link that information from the first information source to the second information source. Step 108 is to determine how the information obtained from the second information source is to be used: will the information be displayed, linked to another information source, or both. Steps 110 and 112 determine whether the desired agent screens have been completely defined. If not, then the process is begun again at step 100 and repeated until all information sources and all desired information have been accessed and displayed as desired. If so, then the process is ended in step 114. In addition to text data fields, other information can also be used and displayed as desired. For example, choosing a "picture" record type, or a "fax" record type, will allow the agent to see the copy of a picture or fax message on the screen at the location that the user has defined that the copy should appear.

The present invention therefore eliminates the complexity of using multiple application programs and multiple sources by automatically accessing the source and extracting the desired data without knowledge of or intervention by the agent. There is a topmost layer, the visual layer, which the agent sees, and several lower layers, which the agent does not see, but which perform the time-consuming and tedious tasks of accessing the source, sending the index to the source, receiving information from the source, and extracting the desired item of information from the totality of information received. An action by the agent at the visual layer automatically invokes the operation of the linked sub-layers so as to perform the action by the agent. E.g., the typing of a is new telephone number for a customer record by the agent automatically calls up the objects which access the defined sources and which update the telephone number field in those sources. Thus, the agent need not open a different application for each source nor learn how to use that different application. The agent need only learn the single, uniform set of screens created by, or at the instance of, the user or system administrator. Further, these screens are designed by the user so that the desired information is accessed, combined, and presented in a manner deemed most useful by the user, regardless of how the information would be stored or presented if a source or application program were directly accessed by the agent. These actions are automatically handled, in the background, by the user-created interpreter application program.

Assume now that the interpreter program has been installed and that the call center of FIG. 1 is fully functional.

Figure 4A:
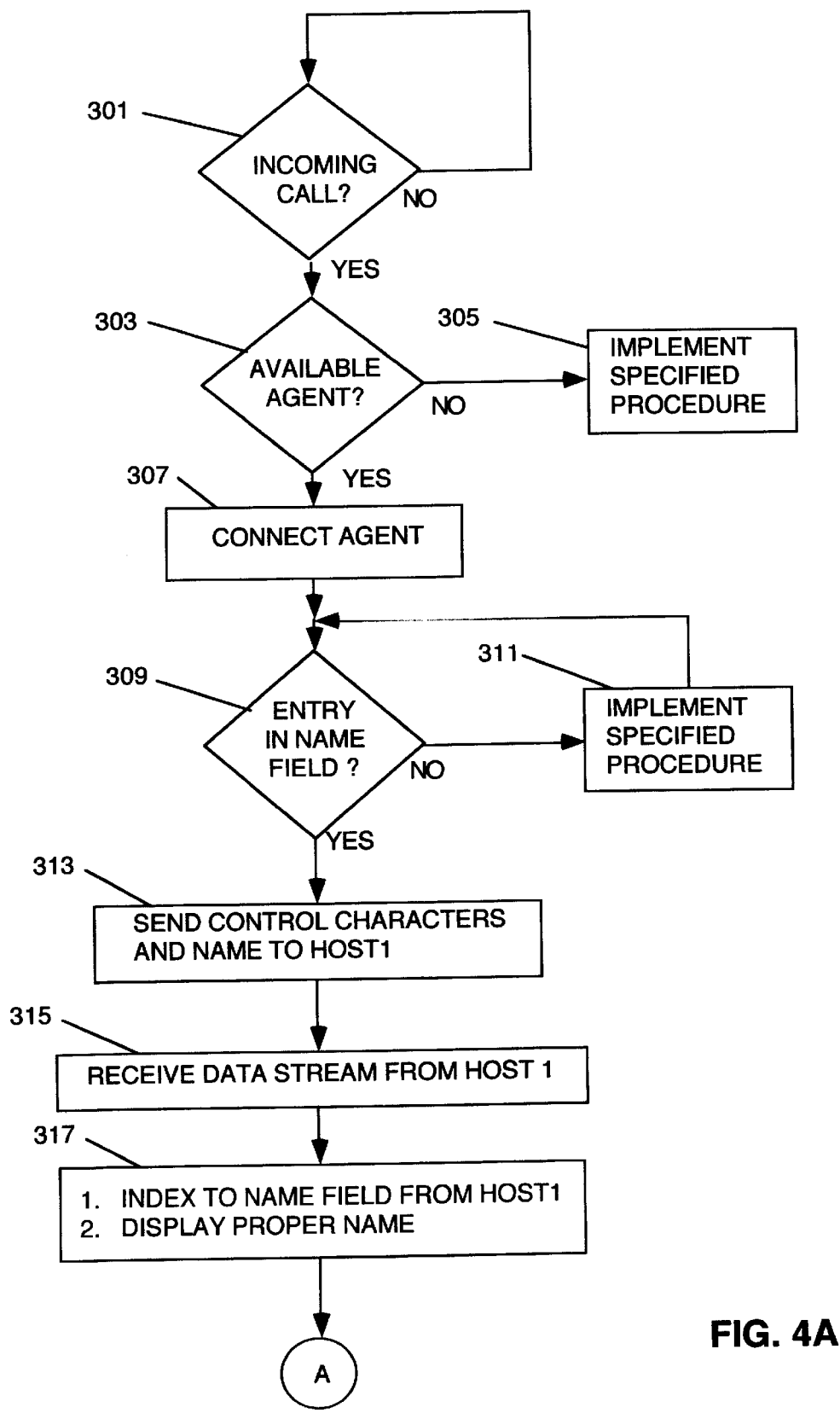
FIGS. 4A–4C are a flowchart of the operation of the preferred embodiment of the present invention.
Figure 4B:
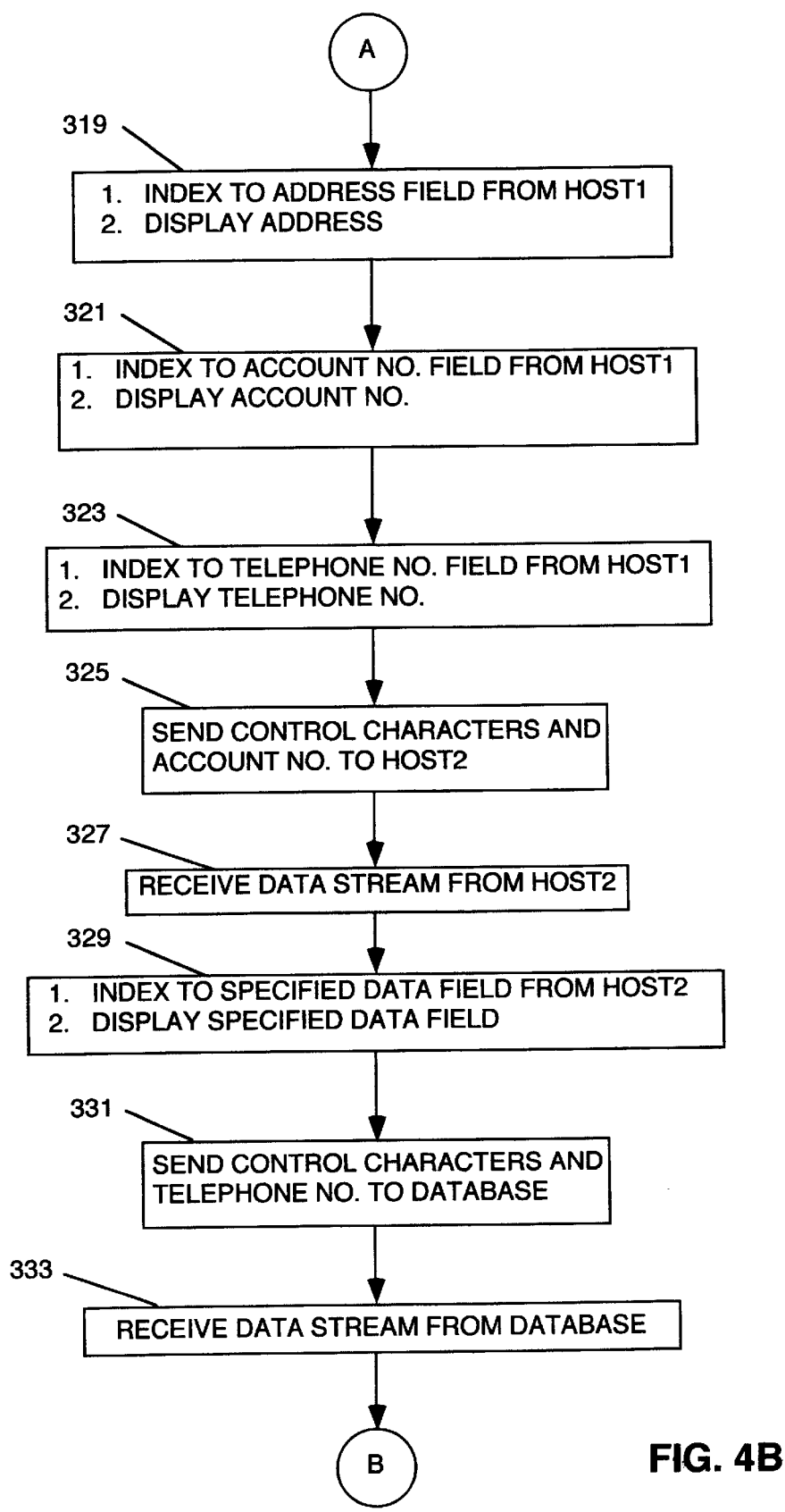
Figure 4C:
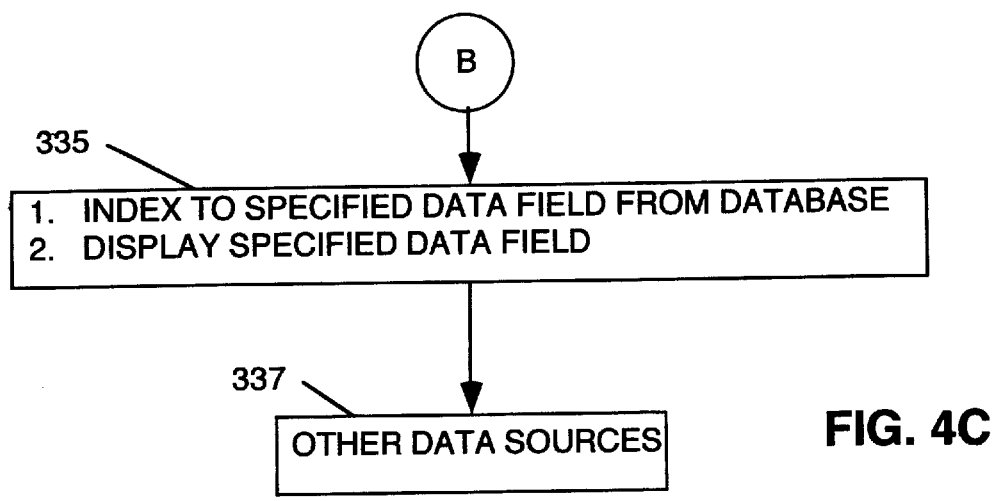

FIGS. 4A–4C are a flowchart of the operation of the preferred embodiment of the present invention in one environment, that of processing incoming calls.

At decision 301, the call center is waiting for an incoming call. Detection, answering and routing of incoming calls are automatically handled by one of the components of the call center, for example, by a voice switch, such as a PBX or an ACD, or by a HOST 13, or by the DIALER 12. If there is an incoming call then, at decision 303, the system determines whether an agent is available to handle the call. If not, then the system implements 305 the user-specified procedure. Some examples of such a procedure are not answering the call, answering the call and playing a hold message, answering the call and executing an automated, interactive process with the calling party, etc.

If an agent is available then in step 307 the system will connect the calling party to the agent. If automatic number identification (ANI) is used, such as in U.S. Pat. No. 4,797,911, then the ANI information provides the telephone number of the calling party. This information may be used to automatically initiate the linking process so as to cause a completed screen to appear to the agent when the agent is connected to the calling party. If ANI is not used or if there is no information available from the information sources based on the ANI information, then, at this point, control of the process switches to the agent station 10 of the connected agent. An interactive voice response (IVR) message and system (not shown) asks the calling party to enter, via voice or DTMF tones, the calling party account number or other key or index. This information also may be used to automatically initiate the linking process so as to cause a completed screen to appear to the agent when the agent is connected to the calling party. The agent will begin talking with the calling party, preferably using a prompt screen, and will ask the calling party for his or her name (or some other index or indices as specified by the user, such as an account number, address, telephone number, etc.), which the agent will enter in the name field 26 on the agent's screen display 20 of FIG. 2H. At decision 309 the station 10 determines whether the name field is completed, such as by the agent pressing the ENTER key (not shown) on the keyboard. If there is no entry in the NAME field the station 10 may implement other specified procedures in step 311, which may run in the background, such as uploading changes from a previous transaction, compiling statistics, serving as an information source for another station, etc. If, at decision 309, the station 10 determines that a name has been entered in the NAME field then the station 10 sends 313 the necessary control characters and query commands and the NAME field to the HOST1. The control characters and query commands are those characters and commands necessary for the HOST1 to recognize that these characters belong to a specified data field, and that information has been requested concerning the person or account whose name is now in the NAME field.

The station 10 then waits to receive 315 the information data stream from the HOST1. This data stream will contain whatever information the HOST1 provides in response to a query using the NAME field. In some hosts, the control characters may specify the particular response desired from the host, such as which data field or fields or screens are requested. Once the information stream has been received then 317 the agent station 10 indexes to the name field and displays the name field received from the host. Thus, the agent station 10 provides the name of the calling party as an index to the host application and has been provided the full name of the calling party as listed in the HOST1. The station 10 positions to the name field by discarding the control characters, text, etc., that precedes the name field. This positioning information was previously defined by the user, as explained above. "Screen scraping", also described above, may also be used where necessary.

The agent station 10 then 319 positions to the address field and displays the address field received from the host.

The agent station 10 then 321 positions to the account number field and displays the account number field received from the host.

Lastly in this example, the agent station 10 then 323 positions to the telephone number field and displays the telephone number field received from the host. At this point, the name, address, account number, and telephone number of the calling party have been displayed. Note that all such positioning and displaying is done automatically by the application program running in the agent station 10.

The linking process preferably begins at this point. However, it should be noted that the linking process may begin as soon as the information necessary for a link has been received. In step 325 the agent station 10 sends the necessary control characters and commands and the account number to the HOST2. In step 325 the data stream is received from the HOST2. Then, in step 329, the agent station 10 positions to the specified data field in the received data stream, and extracts and displays that data field in the designated data box or area on the agent's screen.

In step 331 the agent station 10 sends the necessary control characters and commands and the telephone number to the DATABASE. In step 333 the data stream is received from the DATABASE. Then, in step 335, the agent station 10 positions to the specified data field in the received data stream, and displays that data field in the designated data box or area on the agent's screen. Although, in this example, the information from the HOST1 is being used to access the HOST2 and the DATABASE, the present invention is not so limited. As previously, the information from the different information sources may be sequentially linked. For example, if the HOST1 did not provide a telephone number data entry field, but the HOST2 did provide this field, then the NAME entry is used to access the HOST1. The ADDRESS field is then stripped from the data stream from the HOST1 and automatically sent to the HOST2 so as to access the HOST2. The TELEPHONE NUMBER field is then stripped from the data stream from the HOST2 and automatically sent to the DATABASE so as to access the DATABASE. Thus, the agent has only had to enter a single identification field and the desired information from multiple information sources is automatically obtained and displayed, even when the information from a first information source had to be used to access a second information source, the information from the second information source used to access a third information source, the information from the third information source used to access a fourth information source, etc.

In step 337, the agent station 10 then repeats, for example, steps 331–335 for other information sources, as specified, for example, the DIALER, a PBX/ACD, the image server 15A, the fax server 15B, possibly a credit reporting host available via the LAN 14 or via modem or other suitable electronic communications media. The information used to access these other information sources may be any of the information that is available from the information stream from any of the information sources already accessed, or may be an entry by the agent.

It will be appreciated that the agent has simply entered the name of the calling party, or some other similar index, and has been provided with the proper name of the calling party, the address, the telephone number by one information source (HOST1), selected information from a second information source (HOST2), selected information from a third information source (DATABASE), and selected information from other information sources (DIALER, etc.). Therefore, with a minimum level of effort, without having to remember which host may contain the desired information, without having to manually swap among hosts, and without having to search for information hidden among several different screen formats, the agent has been provided with full information necessary to properly assist the calling party very quickly, at the instant the agent is first connected to the calling party.

Although FIGS. 4A–4C are concerned with the processing of an inbound call, the present invention is not so limited. The present invention is also useful in connection with the processing of outbound calls. The placement of outbound calls, the detection of the status (ringing, answered, no answer, busy, etc.) of outbound calls, and the routing of answered outbound calls to an available agent, are automatically handled by one of the components of the call center, for example, by the DIALER 12. Because the call is an outbound call, one or more items of information, such as the telephone number, the name, the address, etc., will be available from the device that initiates the outbound call, whether that device be an agent STATION 10, the DIALER 12, a HOST 13, etc. As a consequence, it is not necessary to wait for the agent to enter any item in order to obtain the full information about the called party. Rather, based upon the information from the initiating device, the present invention automatically accesses the different sources of information and obtains the user-specified additional information. Thus, when an outbound call is answered, the DIALER 12 (or some other device such as a HOST 13) will instruct the PBX/ACD (not shown here, but shown in the referenced U.S. patents) to connect the called party to an available agent, and will send one or more indices (telephone number, name, account number, etc.) to the station 10 of the available agent. In response to receipt of such index or indices, the application program will, in accordance with the present invention, access the user-specified sources and obtain the user-specified information. Thus, the present invention automatically gathers the user-specified information and instantly presents this information to the agent. Therefore, when the outbound call is answered the agent instantly has the complete information needed to properly service the called party, regardless of whether that outbound call is for sales, collections, to advise of the status of an order, to report a problem in filling an order, to return an earlier call by the customer, etc.

The steps for developing the set of screens for the processing of an outbound call are very similar to the steps for developing the sets of screens for the processing of an inbound call, except that all of the user-specified information is automatically available without any input from the agent. That is, the device initiating the call provides the index or indices necessary to initiate the information gathering process. The designation of sources, the selection of the items of information to be presented, the location and presentation of those items on the set of screens, the media type, etc., for outbound calls are the same as for inbound calls. The user can specify what items of information are to obtained from what sources, and where the items of information are to be presented on the uniform set of screens of the agent. The uniform set of screens for outbound calls is preferably, but need not be, the same as the uniform set of screen for the inbound calls. The present invention therefore provides for the automatic accessing, combining, processing, and presentation of different types of information, for outbound calls, from different sources, in different media types, etc., without any action on the part of the agent. Therefore, without having to enter any information whatsoever, without having to remember which host or information source may contain the desired information, without having to manually swap among hosts, and without having to search for information hidden among several different screen formats, the agent has been provided with full information necessary to properly assist the called party very quickly, at the instant the agent is first connected to the called party. As in the case for inbound calls, information entered by the agent is automatically and instantly communicated to the different sources of information so that all sources of information are continuously maintained with an updated status.

Figure 5:
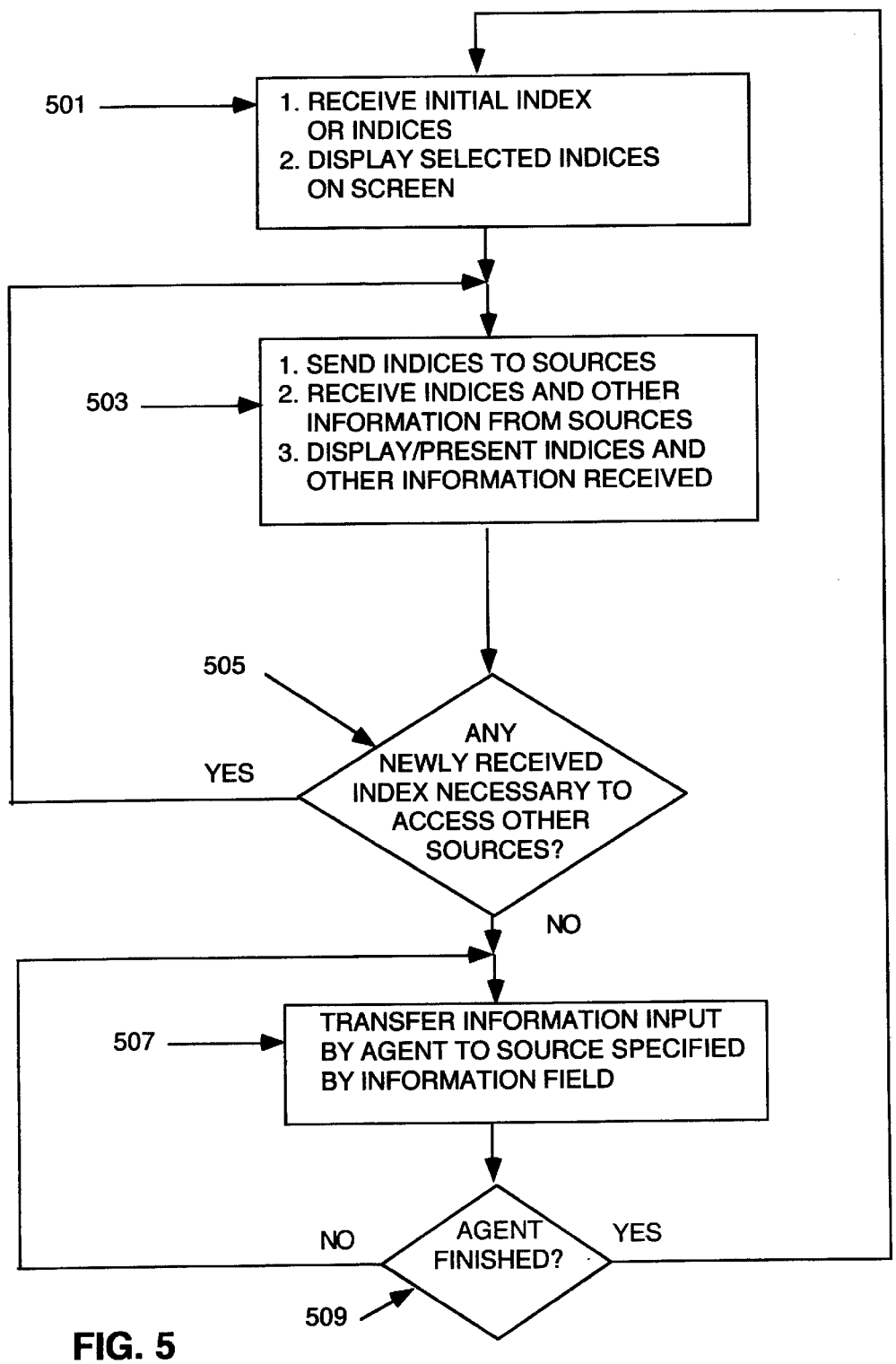
FIG. 5 is a flow chart summarizing the process of FIG. 4.

FIG. 5 is a flow chart summarizing the process of FIG. 4. In step 501 the station 10 receives the initial index or indices from, for example, an input from an ANI detection device or an agent in the case of an inbound call, or from a transfer from another device, such as a dialer 12 in the case of an outbound call. In step 503 the station 10 sends this index or these indices to the sources specified by the information field, receives additional indices and/or information from these sources, and (optionally) displays or presents the indices and other information received. The presentation of such information encompasses multiple media types, such as displaying text or a picture, displaying or printing a facsimile message, playing an audio message or sound clip, etc.

In decision 505 the station 10 determines whether any of the indices or information that it received from the other sources in step 503 is necessary to access any other source or sources. If so then steps 503 and 505 are repeated with the new indices/information until all of the indices/information have been obtained from all of the sources.

Then, in step 507 the station 10 transfers information input by the agent to the source specified by the information field into which the agent is entering the information. For example, if the agent types in a new telephone number in the telephone number field then this new telephone number is automatically sent, with instructions to update the record, to all of the data sources which were specified as being linked to the telephone number field. In this manner, changes to the records of a customer are automatically and instantly made in all of the sources (virtual broadcasting).

In decision 509 the station 10 determines whether the agent has completed servicing the customer at hand, such as by the agent pressing a specified key, or clicking on a specified icon, etc. If not, then the station returns to step 507. If the agent has finished then the station returns to step 501 to await receipt of the next initial index, whereupon the process begins again.

Thus, the agent need not switch between sources or applications, or be familiar with the details of operation of a source or application, or know how to access a source or application, because these details are automatically tended to by the interpreter application program on the station 10. The agent can therefore devote his or her time to speedily and effectively servicing the customer.

The builder program and the interpreter application program are not limited to use on the agents' stations 10. They may be used on any device which needs to obtain information from another source or sources. For example, an interpreter application may be installed on the DIALER 12. As stated above, the access time for some sources is quite long, easily reaching several seconds, and sometimes even more. When the agent switches to such a slow source to obtain information there will be a noticeable time lag while that slow source responds to the query and provides the desired information. This time lag reduces agent efficiency. This time lag can also be distressing to the customer who must wait until the slow source has provided the requested information to the agent, especially if the agent must access several slow sources in order to obtain all of the information necessary to service the customer. The present invention provides a solution to this problem. The user can create an interpreter application program, for the DIALER, which specifies what information the DIALER 12 is to obtain, from what sources the information is to be obtained, and how this information is to be combined in a dialer database, such as a call record. This program for the DIALER 12 is created by the user in the same manner as the program for the agent station 10. However, there will generally be no need to display the information because the Dialer generally operates without human intervention. Therefore, the DIALER 12 will simply collect the information, combine the information in the manner specified by the user in the interpreter program, and store the information in a database. The information collected may be any type of information in any media, such as text, spreadsheets, facsimile, pictures, sound, etc.

In operation, when the DIALER 12 contacts a source to obtain a calling list or calling lists from that source, or when a source contacts the DIALER 12 to provide a calling list to the DIALER, the DIALER 12 will begin contacting the sources specified by the user in the interpreter application program so as to obtain and combine the user-specified information in the user-specified manner. The DIALER will then store this combined information in a database specified by the user. This database may be part of, or may be different from, the call record database of the DIALER. The DIALER preferably obtains the userspecified information off-line, that is, before the agent is connected to a customer. It is well known for a dialer to place an outbound call to a telephone number in a calling list at a time specified by the user. Thus, when an outbound call is placed and answered, and the call is connected to an available agent, the DIALER 12 will send some of the information in this database, such as the telephone number of the called party, to the station 10 of the available agent. The station 10 will, in response to receipt of this information and in accordance with its interpreter program, immediately request the DIALER 12 to provide the user-specified information, preferably including the information obtained from the slow sources. This information from the DIALER 12 will then be presented to the agent, used to contact other sources, combined with information from other sources, etc., as specified by the user via the interpreter program. Thus, the agent, when connected to the call, immediately has all of the information necessary to service the called party.

If the information was obtained from the sources by the DIALER 12 substantially in advance of the time that the outbound call was placed, the information may be outdated. Thus, in this case, the user may specify, via the interpreter application program, that once the station 10 has received the information from the DIALER then the station 10 will access the user-specified sources to obtain the current information, and will update the information presented to the agent as that current information is received.

In another embodiment, the DIALER 12 does not contact the sources when the calling list is loaded but waits until the outbound call is being placed, or is about to be placed (in the queue to be placed), or has just been placed. The time required for an outbound call to be placed and answered generally provides adequate time to access even a slow source. Thus, the information that the DIALER provides to the agent station 10 will be the current information. However, if the user so desires and specifies, the station 10 will still access the various sources so that any updates or new entries by the agent are automatically provided to the sources for updating of the records in the sources.

In another embodiment, the combined database of information obtained from the various sources is maintained by a separate device, such as a server or another station 10, and not by the DIALER 12. This separate device has its own interpreter application program and, as above for the dialer, collects the user-specified information from the various sources, combines the information in the manner specified by the user, and stores the combined information in the device database. In this case, this database, regardless of where it may be located, is simply another source which the user may specify when the user is creating the interpreter application program for the agent station 10.

Therefore, in accordance with the present invention, when a calling list is downloaded, the user-specified information from the user-specified sources will be obtained and combined, preferably in advance of the placement of an outbound call, and this information will be provided to the station of the available agent when the agent is connected to the called party. Thus, the agent instantly has the information necessary to service the called party, even when the information is obtained from one or more slow-responding sources.

From a reading of the description above of the preferred embodiment of the present invention, modifications and variations thereto may occur to those skilled in the art. Therefore, the scope of the present invention is to be limited only by the claims below.

We claim:

1. A method for obtaining and presenting information items from a plurality of information sources for an outbound communication, comprising the steps of:

obtaining a first information item for said outbound communication;

subsequent to said obtaining a first information item, automatically sending said first information item to a first information source as a request for a second information item and to a second information source as a request for a third information item, receiving said second information item from said first information source, and receiving said third information item from said second information source;

subsequent to said obtaining a first information item, automatically initiating said outbound communication based upon said first information item;

subsequent to said step of obtaining a first information item, monitoring said outbound communication for a response; and subsequent to said obtaining a first information item, if a response to said outbound communication has been received then automatically connecting said outbound communication to an agent, and automatically and simultaneously displaying at least two predetermined ones of said first, second and third information items to said agent.

2. The method of claim 1 wherein said step of automatically sending said first information item to a first information source is performed prior to said step of automatically initiating said outbound communication.

3. The method of claim 1 wherein said step of automatically sending said first information item to a first information source is performed after said step of automatically initiating said outbound communication and prior to said step of monitoring said outbound communication.

4. The method of claim 1 wherein said step of automatically sending said first information item to a first information source is performed after said step of monitoring said outbound communication and prior to said step of automatically connecting said outbound communication.

5. The method of claim 1 wherein said step of automatically sending said first information item to a first information source is performed after said step of automatically connecting said outbound communication and prior to said step of automatically and simultaneously displaying at least two predetermined ones.

6. The method of claim 1 and further comprising the step of automatically storing at least two predetermined ones of said first, second, and third information items in a database; and wherein said step of automatically and simultaneously displaying at least two predetermined ones comprises automatically recalling and displaying said predetermined ones stored in said database.

7. The method of claim 1 wherein said step of automatically sending said first information item to a first information source is performed prior to said step of automatically initiating said outbound communication;

said method further comprising the step of automatically storing at least two predetermined ones of said first, second, and third information items in a database; and wherein said step of automatically and simultaneously displaying at least two predetermined ones comprises automatically recalling and displaying said predetermined ones stored in said database.

8. The method of claim 1 wherein said step of automatically sending said first information item to a first information source is performed after said step of automatically initiating said outbound communication and prior to said step of monitoring said outbound communication;

said method further comprising the step of automatically storing at least two predetermined ones of said first, second, and third information items in a database; and wherein said step of automatically and simultaneously displaying at least two predetermined ones comprises automatically recalling and displaying said predetermined ones stored in said database.

9. The method of claim 1 wherein said step of automatically sending said first information item to a first information source is performed after said step of monitoring said outbound communication and prior to said step of automatically connecting said outbound communication;

said method further comprising the step of automatically storing at least two predetermined ones of said first, second, and third information items in a database; and wherein said step of automatically and simultaneously displaying at least two predetermined ones comprises automatically recalling and displaying said predetermined ones stored in said database.

10. The method of claim 1 wherein said step of automatically sending said first information item to a first information source is performed after said step of automatically connecting said outbound communication and prior to said step of automatically and simultaneously displaying at least two predetermined ones;

said method further comprising the step of automatically storing at least two predetermined ones of said first, second, and third information items in a database; and wherein said step of automatically and simultaneously displaying at least two predetermined ones comprises automatically recalling and displaying said predetermined ones stored in said database.

11. A method for obtaining and presenting information items from a plurality of information sources for an outbound communication, comprising the steps of:

obtaining a first information item for said outbound communication;

subsequent to said obtaining a first information item, automatically sending said first information item to a first information source as a request for a second information item, receiving said second information item from said first information source, automatically sending said second information item to a second information source as a request for a third information item, receiving said third information item from said second information source, sending said third information item to a third information source as a request for a fourth information item, and receiving said fourth information item from said third information source;

subsequent to said obtaining a first information item, automatically initiating said outbound communication;

subsequent to said obtaining a first information item, monitoring said outbound communication for a response; and subsequent to said obtaining a first information item, if a response to said outbound communication has been received then automatically connecting said outbound communication to an agent, and automatically and simultaneously displaying at least two predetermined ones of said first, second, third and fourth information items to said agent.

12. The method of claim 11 wherein said step of automatically sending said first information item to a first information source is performed prior to said step of automatically initiating said outbound communication.

13. The method of claim 11 wherein said step of automatically sending said first information item to a first information source is performed after said step of automatically initiating said outbound communication and prior to said step of monitoring said outbound communication.

14. The method of claim 11 wherein said step of automatically sending said first information item to a first information source is performed after said step of monitoring said outbound communication and prior to said step of automatically connecting said outbound communication.

15. The method of claim 11 wherein said step of automatically sending said first information item to a first information source is performed after said step of automatically connecting said outbound communication and prior to said step of automatically and simultaneously displaying at least two predetermined ones.

16. The method of claim 11, further comprising the step of automatically storing at least two predetermined ones of said first, second, third, and fourth information items in a database; and wherein said step of automatically and simultaneously displaying at least two predetermined ones comprises automatically recalling and displaying said predetermined ones stored in said database.

17. The method of claim 11 wherein said step of automatically sending said first information item to a first information source is performed prior to said step of automatically initiating said outbound communication;

said method further comprising the step of automatically storing at least two predetermined ones of said first, second, third, and fourth information items in a database; and wherein said step of automatically and simultaneously displaying at least two predetermined ones comprises automatically recalling and displaying said predetermined ones stored in said database.

18. The method of claim 11 wherein said step of automatically sending said first information item to a first information source is performed after said step of automatically initiating said outbound communication and prior to said step of monitoring said outbound communication;

said method further comprising the step of automatically storing at least two predetermined ones of said first, second, third, and fourth information items in a database; and wherein said step of automatically and simultaneously displaying at least two predetermined ones comprises automatically recalling and displaying said predetermined ones stored in said database.

19. The method of claim 11 wherein said step of automatically sending said first information item to a first information source is performed after said step of monitoring said outbound communication and prior to said step of automatically connecting said outbound communication;

said method further comprising the step of automatically storing at least two predetermined ones of said first, second, third, and fourth information items in a database; and wherein said step of automatically and simultaneously displaying at least two predetermined ones comprises automatically recalling and displaying said predetermined ones stored in said database.

20. The method of claim 11 wherein said step of automatically sending said first information item to a first information source is performed after said step of automatically connecting said outbound communication and prior to said step of automatically and simultaneously displaying at least two predetermined ones;

said method further comprising the step of automatically storing at least two predetermined ones of said first, second, third, and fourth information items in a database; and wherein said step of automatically and simultaneously displaying at least two predetermined ones comprises automatically recalling and displaying said predetermined ones stored in said database.

21. A method for obtaining and presenting information items from a plurality of information sources for an inbound communication, comprising the steps of:

receiving identification information from the header of said inbound communication;

subsequent to said receiving identification information from the header, automatically sending said identification information to a first information source as a request for a first information item and to a second information source as a request for a second information item, receiving said first information item from said first information source, and receiving said second information item from said second information source;

subsequent to said receiving identification information from the header, connecting said inbound communication to an agent; and subsequent to said receiving identification information from the header, automatically and simultaneously displaying at least two predetermined ones of said identification information, said first information item, and said second information item to said agent.

22. The method of claim 21 wherein said step of automatically sending said identification information to a first information source is performed prior to said step of connecting said inbound communication to an agent.

23. The method of claim 21 wherein said step of automatically sending said identification information to a first information source is performed after said step of connecting said inbound communication to an agent and prior to said step of automatically and simultaneously displaying at least two predetermined ones.

24. The method of claim 21 and further comprising the step of automatically storing at least two predetermined ones of said identification information, said first information item, and said second information item in a database; and wherein said step of automatically and simultaneously displaying at least two predetermined ones comprises automatically recalling and displaying said predetermined ones stored in said database.

25. The method of claim 21 wherein said step of automatically sending said identification information to a first information source is performed prior to said step of connecting said inbound communication to an agent;

said method further comprising the step of automatically storing at least two predetermined ones of said identification information, said first information item, and said second information item in a database; and wherein said step of automatically and simultaneously displaying at least two predetermined ones comprises automatically recalling and displaying said predetermined ones stored in said database.

26. The method of claim 21 wherein said step of automatically sending said identification information to a first information source is performed after said step of connecting said inbound communication to an agent and prior to said step of automatically and simultaneously displaying at least two predetermined ones;

said method further comprising the step of automatically storing at least two predetermined ones of said identification information, said first information item, and said second information item in a database; and wherein said step of automatically and simultaneously displaying at least two predetermined ones comprises automatically recalling and displaying said predetermined ones stored in said database.

27. A method for obtaining and presenting information items from a plurality of information sources for an inbound communication, comprising the steps of:

receiving identification information from the header of said inbound communication;

subsequent to said receiving identification information from the header, automatically sending said identification information to a first information source as a request for a first information item, identification receiving said first information item from said first information source, automatically sending said first information item to a second information source as a request for a second information item, receiving said second information item from said second information source, automatically sending said second information item to a third information source as a request for a third information item, and receiving said third information item from said third information source;

subsequent to said receiving identification information from the header, automatically connecting said inbound communication to an agent; and subsequent to said receiving identification information from the header, automatically and simultaneously displaying at least two predetermined ones of said identification information, said first information item, said second information item and said third information item to said agent.

28. The method of claim 27 wherein said step of automatically sending said identification information to a first information source is performed prior to said step of connecting said inbound communication to an agent.

29. The method of claim 27 wherein said step of automatically sending said identification information to a first information source is performed after said step of connecting said inbound communication to an agent and prior to said step of automatically and simultaneously displaying at least two predetermined ones.

30. The method of claim 27 and further comprising the step of automatically storing at least two predetermined ones of said identification information, said first information item, said second information item, and said third information item in a database; and wherein said step of automatically and simultaneously displaying at least two predetermined ones comprises automatically recalling and displaying said predetermined ones stored in said database.

31. The method of claim 27 wherein said step of automatically sending said identification information to a first information source is performed prior to said step of connecting said inbound communication to an agent;

said method further comprising the step of automatically storing at least two predetermined ones of said identification information, said first information item, said second information item, and said third information item in a database; and wherein said step of automatically and simultaneously displaying at least two predetermined ones comprises automatically recalling and displaying said predetermined ones stored in said database.

32. The method of claim 27 wherein said step of automatically sending said identification information to a first information source is performed after said step of connecting said inbound communication to an agent and prior to said step of automatically and simultaneously displaying at least two predetermined ones;

said method further comprising the step of automatically storing at least two predetermined ones of said identification information, said first information item, said second information item, and said third information item in a database; and wherein said step of automatically and simultaneously displaying at least two predetermined ones comprises automatically recalling and displaying said predetermined ones stored in said database.

33. A method for generating a database, comprising the steps of:

obtaining a contact list from a first information source;

extracting a first information item from said contact list;

automatically sending said first information item to a second information source as a request for a second information item and to a third information source as a request for a third information item;

receiving said second information item from said second information source;

receiving said third information item from said third information source; and automatically storing at least two predetermined ones of said first, second, and third information items in said database.

34. A method for generating a database, comprising the steps of:

obtaining a contact list from a first information source;

extracting a first information item from said contact list;

automatically sending said first information item to a second information source as a request for a second information item;

receiving said second information item from said second information source;

automatically sending said second information item to a third information source as a request for a third information item;

receiving said third information item from said third information source; and automatically storing at least two predetermined ones of said first, second, and third information items in said database.

* * * * *